Figure 1:
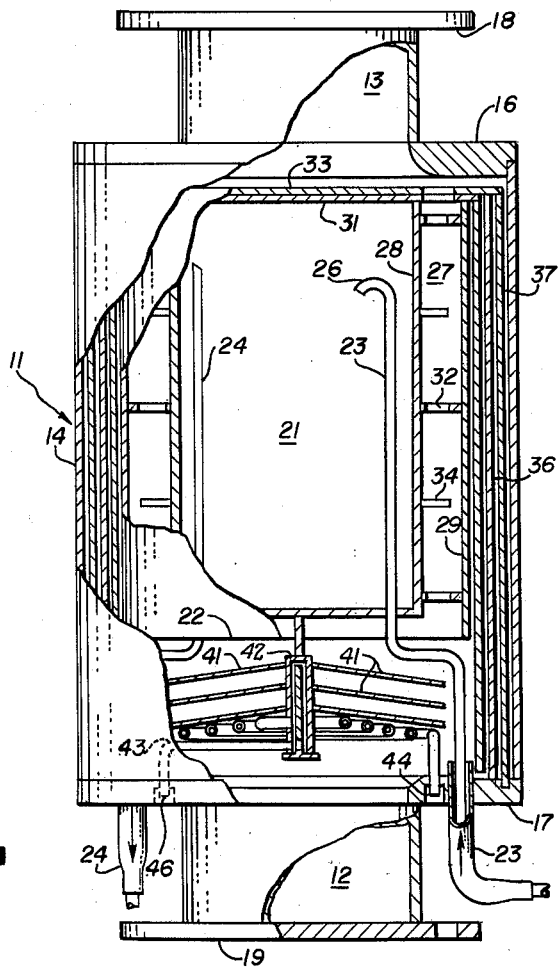

March 12, 1963  N. MILLERON  3,081,068
COLD TRAP
Filed Oct. 16, 1959

INVENTOR
NORMAN MILLERON

BY
ATTORNEY

United States Patent Office 3,081,068
Patented Mar. 12, 1963

3,081,068
COLD TRAP
Norman Milleron, Berkeley, Calif., assignor to the United States of America as represented by the United States Atomic Energy Commission
Filed Oct. 16, 1959, Ser. No. 847,032
3 Claims. (Cl. 62—332)

This invention relates to cold traps for gases and vapors in general; and in particular it relates to a liquid coolant trap for condensing oil vapors at the inlet of an oil diffusion pump working at ultra low pressures and large volumes, and the like.

The invention provides a lineal flow, high conductance cold trap which prevents backward migration of condensable oil or other vapors past the point of the trap. Functionally, surface migration along a lineal passageway is prevented by a structural provision for liquid cooling of all wall surfaces around a passageway cross section. Critically spaced and shaped structure in conducting relation with a coolant also protrudes into the passageway to ensure vapor condensation without impedance to high throughput. The precise invention, as indicated by the claims, resides in the exact combination and structure of the coolant pot, passage defining structure, condensing structure, insulating material and sealing means together with a "bake-out condensing means" and other structure specified in the embodiments.

In the low vacuum pressure art, vacuums lower than about $10^{-6}$ mm. Hg were generally not required or thought to be desirable prior to nuclear applications in the 1940's. However, in the present technology of mass spectrometers, particle accelerators, controlled thermonuclear reactions, electronic applications, space research and associated fields, pressures of $10^{-10}$ mm. Hg and lower are frequently desired. Typical optimum requirements for vacuum pumps in modern technology are exemplified in plasma containment experiments, accelerator systems and ion sources in which an almost absolute gaseous source sink relationship must be maintained. In the use of such equipment, energetic charged particles and energetic neutral particles are continuously introduced or produced in the system. The vacuum pump or sink must be capable of both initial evacuation and consequent removal of the total output of desirable fast particles and an irreducible amount of slow neutral particles to maintain a very low density of "cold" neutral gas.

Principal reliance in most low pressure pumping applications has been placed upon diffusion pumps, because of their high pumping capacity. However, oil diffusion pumps in the past have been limited to a lower pumping pressure of about $10^{-6}$ mm. Hg because at this pressure the oil or other pumping fluid tends to vaporize and diffuse back into the cavity being pumped. For lower pressures the diffusion pump is frequently used in combination with other pumping means, such as ion pumps or gettering pumps. Even in this arrangement the diffusion pumps are not entirely satisfactory because not only does the oil back diffuse at the lower pressures, but it also tends to creep back along wall surfaces and contaminate other vacuum equipment. Also, there are many applications where a need for simplicity, economics or other reasons do not justify using diffusion pumps in combination with other pumping means.

However, it has been established both theoretically and experimentally that arbitrarily low vacuum pressures can be attained with diffusion pumps when back diffusion of the pumping fluid is eliminated, assuming of course that the rate of evolution of gases from surfaces, magnitude of atmospheric leaks and permeations, and the speed of the pump and its connecting impedances may be controlled also to permit attainment of pressures within the range desired. Functionally, back diffusion may be prevented by employing working surfaces which catch and retain or condense all working fluid that diffuses back from the pump inlet by either surface or volume migration. In the prior art, much attention has been directed to traps cooled by liquid nitrogen or other means. Ideally, a liquid nitrogen cooled surface contacts each gaseous molecule being pumped so that all gaseous molecules are lowered to a temperature of the order of the coolant. High boiling molecules then condense out and are trapped or drain back into the pump.

In practice most cold traps have emphasized one design feature while at the same time overlooking problems created by that design. The conventional cold finger or spike trap does not have completely cold wall surfaces so that there is always a portion upon which the condensed working fluid can creep through the inlet. In other traps gaseous molecules are channeled close to cold surfaces or threaded around a conduction cooled barrier. In either event the "number of bounces" of the gas molecules in the direction of flow is rather large and the effective orifice size is reduced so that the pumping volume of the diffusion pump is greatly diminished. Yet in traps scaled up to have wide mouths, permitting the flow of large volumes, effective cooling and condensation is not obtained.

The present invention combines structural features which largely eliminate the problems pointed out hereinabove. One preferred embodiment comprises a central solid cylindrical liquid nitrogen pot disposed within a larger concentric outer cylinder having top and bottom cover plates and being adapted for coaxial union with an inlet to a diffusion pump at the lower extremity. At the upper extremity there is provided an outlet adapted for integral joinder to a vacuum tank or other vacuum equipment. A straight passageway for gases to be pumped is provided around the liquid nitrogen pot. The outer concentric wall of this passage is formed from copper or other conductor extending somewhat above and thermally connected to the inner liquid nitrogen pot to provide additional cooling. Where inner and outer wall separation is greater than the mean free path of the gases removed at the temperature and pressure of removal, fins, spikes, baffle plates, etc., protrude radially from the pot to provide additional surface area for cooling contact. Outwardly from the outer wall of the gas passageway there is disposed a concentric roll of thin stainless steel or other insulating material which is sealed off to prevent bypass of oil or gas. Special water cooled means is provided to preclude oil condensation during bakeout.

An alternate preferred embodiment comprises an annular pot with conducting spikes, baffles, corrugated sheet, etc., within the passageway defined by the annular pot. The passageway may be conveniently scaled by providing additional conducting surface within the area enclosed by the inner wall of the annular pot. Insulation is provided outwardly of the annular pot, as in the prior embodiment. In each embodiment the gas passageway is relatively straight, or distorted only enough to prevent line-of-sight travel, and material in thermal conducting relation with the pot is disposed to ensure contact of each gaseous particle with several cold surfaces as it "bounces" through the trap at the pressure being pumped. Oil or other organic matter is effectively contained by the large cooling surface area, and as proved by actual use where thousands of liters of air per second were being pumped, the vacuum apparatus beyond the pump inlet does not become fouled and the vacuum is improved by as much as three orders of magnitude. Further efficiencies may be obtained by silver plating all working surfaces. The coil of stainless steel or other material is easy to fabricate and cuts down on heat losses because in each turn there are only a few point contacts with inner and outer turns. The second embodiment is particularly adaptable to scaling. Further inventive refinements are disclosed hereinafter.

There results a coolant trap specifically for use with diffusion pumps which provides a need existing in the art and permits the use of oil diffusion pumps in ultra-high vacuum work. Specifically, suitably scaled embodiments accommodate thousands of liters per second yet do not preclude passage of the matter being trapped in the $10^{-10}$ mm. Hg pressure range. The trap may be conveniently scaled to any size without loss of efficiency. The design is relatively simple and components are easy to fabricate and assemble. The resulting product is not bulky and requires no special equipment or techniques not commonly available. Pressures as low as $10^{-11}$ mm. Hg have already been obtained using the trap, itself indicative of the fact that surface and vapor migration is precluded. The trap is bakable to temperature as high as 400° C. while connected to a diffusion pump, protection being built into the pump to prevent back diffusion of oil during this period. The design provides for high strength and long life.

Accordingly, an object of the invention is to provide a cold trap for condensation of high boiling liquids in spaces through which large volumes of gases are being pumped.

Another object of the invention is to provide a linear flow cold trap for gases in which flow is not restricted, yet in which the probability of contact of each gaseous molecule against a cold surface is large and in which sufficient insulation is provided to minimize heat losses. Another object is to prevent both surface and volume migration of high boiling molecules in the trap. A further object is to construct a trap that is effective, yet simple and inexpensive to fabricate. Another object is to provide a trap which is easily scaled to large sizes and diameters and which is bakable.

Another object of the invention is to provide an insulated cold trap for gases having lineal passageway defined by metal in conducting relation with a coolant and in which further heat exchange is ensured by protruding longitudinal fins, baffles, and in which corrugated sheets or other means provide insulation. Another object is to provide special condensing means for oil vapors during bakeout.

Figure 2:
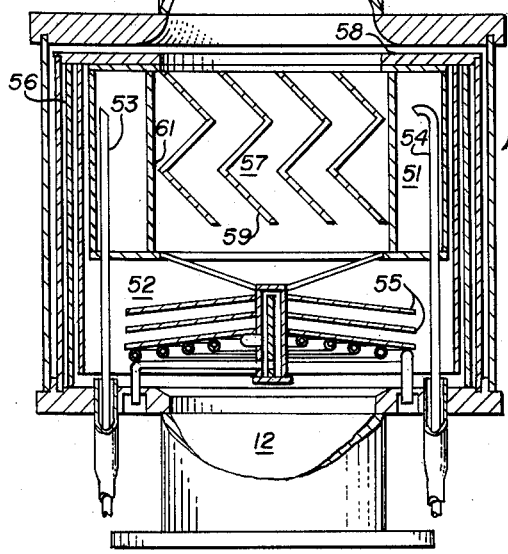

The invention will be better understood upon examination of the following figures, of which:

FIGURE 1 is a side view, partly in cross section, of an embodiment of the cold trap of the invention having a solid cylindrical coolant pot; and FIGURE 2 is a vertical cross sectional view of an embodiment of the cold trap of the invention having an annular coolant pot.

Referring now to the drawings, there is shown in both FIGS. 1 and 2 a vertical shell 11 having a lower opening 12 adaptable to be connected to the pump inlet of an oil diffusion pump (not shown) or the like. An upper opening 13 is similarly adaptable to coupling with a vacuum tank or other chamber (not shown). Within each respective shell housing 11 there is an axial passageway 27 and 57 for the flow of gases defined at least in part by an elongated coolant pot 21 and 51, e.g., a liquid nitrogen pot. The several embodiments have other means and elements in common, including conducting structure, heat excluding structure, bakeout coolant structure, etc., as will be shown in detail hereinafter.

Specifically in the embodiment of FIG. 1, the shell 11 comprises an outer cylindrical housing 14 having top and bottom cover plates 16 and 17, respectively, with flanged connection means 18 and 19 extending therefrom to provide the aforementioned openings. A concentric closed cylindrical pot 21 is disposed within said housing 14 and is supported by fill tube 23 and vent tube 24 which communicate through plate 17. Fill tube 23 has a crook 26 therein at the innermost extremity so that when a liquid gas such as liquid nitrogen is fed into the pot under gas pressure, the initially warm gas that is in the filler line does not hit the inner upper side of the reservoir 21 and thus warm it and release gas such as carbon dioxide that may be trapped there. A similar function would be accomplished if the filler tube were to enter from the top.

Longitudinal passage 27 along the outside of the pot 21 is defined by pot wall 28 and outer concentric conducting wall surface 29 coextensive with the top 31 of the pot 21 and extending slightly below same at the bottom thereof. Wall 29 is positioned and supported by radial conducting supports 32 extending from the wall 28 and by slotted conducting member 33 extending radially outward from top 31 of pot 21. Radial conducting spikes 34 also extend outwardly from pot wall 28 to provide cooling in addition to the two wall surfaces 28 and 29 when pot 21 is filled with liquid gas. Other equivalent cooling structure extending from wall 28 could be used, such as baffle strips or other configurations. The spikes 34 or other cooling means are spaced to provide for the most efficient "capture" or condensation of heavy, condensable molecules with the least impedance to gas flow, namely, one or two, or at least very few bounces through the trap at the equilibrium temperature and pressure of use. Usually this will be about 3 cm. in any direction through the trap, which is equivalent to the mean free path of gas molecules through the trap at $10^{-6}$ mm. Hg and liquid nitrogen temperatures.

Insulation from the outer atmosphere is provided by coil 36 of stainless steel or other material, the insulating effect being due to the fact that there are only a few point contacts between adjacent turns. An outermost turn or cylinder 37 is sealed against bottom cover plate 17 and against an upper slotted plate 33. Oil laden vapors are thereby prevented from passing or bypassing the annular cooled passageway 27.

Water baffles 41 consist of several layers of flat parallel strips 41 of conducting material, such as copper, in conducting relation with a central support 42 which is otherwise thermally insulated from the exterior walls 14 by insulating coil 36. Circulating coolant coil 43 is provided to supply coolant water to the strips 41 and to the central conducting support 42. Coil 43 inlet and outlet connections are provided at 44 and 46. During the initial bakeout of the trap at a temperature approaching 400° C. while connected to a diffusion pump, water is circulated through these strips so that oil will be returned to the diffusion pump, and not contact the outer surface of pot 21, there of course being no coolant present in pot 21. After bakeout is over and liquid nitrogen or other coolant has been introduced into pot 21, the water supply to these strips can be shut off and the temperature thereof will actually be lower than it would be if water were circulating, since the strips lose their heat to the liquid nitrogen by radiation and conduction. The baffle temperature when cooled by loss to the liquid nitrogen has been estimated to be as low as 10° C. by actual measurements.

The alternate preferred embodiment of FIG. 2 employs a concentric annular coolant pot 51. The construction of internal support 52, vent and fill tubes 53 and 54, baffles 55, coiled insulator 56 and other details is similar to that of the prior embodiment. However, the passageway 57 extends through the annular portion of the pot 51 and upper seal plate 58 for the coils of insulator 56 is ring shaped and has no outer slotted portions as does member 33 of FIG. 1. Preferred conductors within the passageway are "herring bone" baffle strips 59 which project inwardly from cold pot wall 61. The shape and spacing of these conductors are of course governed by the same considerations as in the embodiment of FIG. 1.

Example

Two identical cold traps of the exact annular pot design of FIG. 2 were built except that the stainless steel insulating coil was omitted from one of them, thereby permitting the bypassing of the central cold trap passage. The passage conductors each employed herring-bone construction consisting of pieces of $1/16$ inch thick copper sheet formed on a sheet metal brake and hand soldered into the inner diameter of the pot. The inner dimensions of the passage were a longitudinal length of 3 inches and a diameter of 5¾ inches. All welded construction was used. Pot reservoir capacity was ½ liter. Both traps were baked out for about 24 hours at about 400° C. while water was circulated through the baffle and while pumping thereon with an oil diffusion pump, resistance heated tape wrapped around the trap shells being used as heating means.

Using liquid nitrogen as coolant the two traps were used daily thereafter on consecutive days at the pumping inlet of a 4 inch MCF 300 stainless steel diffusion pump using Oct-oil "S," in a vacuum system which operated in the $10^{-10}$ mm. Hg range. The experiments using the trap with the insulation creep barrier in place showed no sign of pressure rise after bakeout. In the runs with the trap having no insulating coil to act as a creep barrier, there was a higher vacuum pressure, caused by the bypass, for about two weeks' time; then, in one day's time the pressure rose up to about $1 \times 10^{-7}$ mm. Hg and remained constant. This result fits well with the assumption that oil was trapped on the baked stainless steel wall for a period of about two weeks until the wall became saturated.

While the invention has been disclosed with respect to several preferred embodiments, it will be apparent to those skilled in the art that numerous variations and modifications may be made within the skill of the art and thus it is not intended to limit the invention except as defined in the following claims.

What is claimed is:

1. In a cold trap preventing vapor and surface migration of low boiling molecules into a vacuum cavity from a diffusion pump or the like, the combination comprising a cylindrical housing having cover plates on each end with flanged openings extending therefrom adaptable for connection to a vacuum facility and to the inlet of a diffusion pump, a sealed coolant pot associated with structure defining a vertical passage between said pump and vacuum inlets, said pot and passage defining structure being supported in said housing and consisting of a thermally conducting material, means for exteriorly filling and venting said pot, conducting surfaces protruding into said passage from said defining structure, said surfaces being shaped and disposed therein to ensure one or more bounces per molecule passing through said trap at pumping pressures below $10^{-6}$ mm. Hg. and coolant temperatures below $-50°$ C., a coil of stainless steel around said pot inside said housing sealed against said bottom cover plate and against passage defining structure at the top thereof thereby preventing vapors and liquids bypassing said passage, said coil supporting said pot in said housing, a series of thermally conducting baffle strips supported below said pot by said lower cover plate, and means for cooling said baffle strips with a coolant from a source exterior said housing.

2. In a cold trap preventing back diffusion of low boiling molecules from the intake of a diffusion pump or the like, the combination comprising a cylindrical housing having cover plates on each end with openings therein adaptable for connection to a vacuum facility and to the inlet of a diffusion pump, a vertical heat conducting structure carried by said housing between said outlets and defining a passageway, a flange rim extending outward from the upper portion of said structure defining said passageway, a sealed heat conducting cylindrical liquid nitrogen coolant pot supported within said passage by a plurality of conducting radial supports, means for exteriorly filling said pot with coolant and venting same, conducting spikes protruding into said passageway from said pot, a coil of stainless steel between said housing and said structure defining said passageway, means for sealing said upper end of said coil against said flange rim and said lower end against said bottom cover plate whereby bypassing of said central passage by said fluid being pumped is prevented.

3. In a cold trap preventing back diffusion of low boiling molecules from the intake of a diffusion pump or the like, the combination comprising a cylindrical housing having cover plates on each end with openings therein adaptable for connection to a vacuum facility and to the inlet of a diffusion pump, an annular shaped sealed coolant pot supported by said lower cover plate, said central passageway therethrough being vertically disposed between said openings in said two cover plates, and said pot consisting of conducting material, a rim extending outward from the top of said annular pot, means for exteriorly filling and venting said pot, a plurality of flat, heat conducting metal strips having a herring-bone cross section in a direction parallel to the flow of gas extending across said passageway defined by said annular pot and in conducting relation therewith, a coil of stainless steel between said housing and said structure defining said passageway, and means for sealing said upper end of said coil against said rim and said lower end against said bottom cover plate whereby bypassing of said central passage by said fluid being pumped is prevented.

References Cited in the file of this patent

UNITED STATES PATENTS

| | | |
|---|---|---|
| 1,851,329 | Replogle | Mar. 29, 1932 |
| 2,386,298 | Downing et al. | Oct. 9, 1945 |
| 2,508,765 | Morand | May 23, 1950 |
| 2,703,969 | Lindsey | Mar. 15, 1955 |